(12) United States Patent
Nakanishi

(10) Patent No.: US 8,018,483 B2
(45) Date of Patent: Sep. 13, 2011

(54) DISPLAY APPARATUS, DISPLAY CONTROL APPARATUS, AND CONTROL METHOD

(75) Inventor: Hiroyuki Nakanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 11/467,947

(22) Filed: Aug. 29, 2006

(65) Prior Publication Data

US 2007/0046805 A1    Mar. 1, 2007

(30) Foreign Application Priority Data

Aug. 30, 2005    (JP) ................................ 2005-249953

(51) Int. Cl.
*H04N 15/00*    (2006.01)

(52) U.S. Cl. ................ 348/53; 348/42; 348/51

(58) Field of Classification Search .................... 348/42, 348/51, 53

See application file for complete search history.

(56) References Cited

U.S. PATENT DOCUMENTS 6,304,287 B1 *  10/2001  Nagata ........................... 348/53

FOREIGN PATENT DOCUMENTS

JP    10-327373    12/1998

* cited by examiner

*Primary Examiner* — Allen Wong
(74) *Attorney, Agent, or Firm* — Cowan, Liebowitz & Latman, P.C.

(57) ABSTRACT

When distortion correction table data held in a memory (140) are registered in table units (131, 132), the registered distortion correction table data are selected. When the distortion correction table data held in the memory are not registered, the distortion correction table data held in the memory (140) are selected, and are registered in the table units (131, 132).

6 Claims, 7 Drawing Sheets

DISPLAY APPARATUS, DISPLAY CONTROL APPARATUS, AND CONTROL METHOD

BACKGROUND OF THE INVENTION

1. Field of the Invention

The present invention relates to a technique for calibrating parameters associated with an imaging apparatus and a display apparatus.

2. Description of the Related Art

Conventionally, a video see-through type head mounted display which fetches a video picture captured at substantially the same position as the pupil position of an observer into a computer or the like and displays that video picture while superimposing a computer graphics (CG) on it has been proposed. Also, a handheld display having the same functions as those of the above display has been proposed.

An example of the head mounted display will be described below using FIGS. 5 to 7.

FIG. 5 is a block diagram showing the hardware arrangement of the conventional video see-through type head mounted display. Note that R and L that follow reference numerals mean components for the right eye and left eye, and form pairs. Therefore, components denoted by the same reference numerals with R and L respectively have the same function, and a description will be given while omitting R and L.

As shown in FIG. 5, the head mounted display comprises a head mounted unit 501 and a control unit 500.

Referring to FIG. 5, reference numeral 110 denotes an imaging element such as a CCD, CMOS area sensor, or the like, which captures a moving image. Reference numeral 111 denotes an analog image processor which includes AGC (automatic gain control), CDS (correlated double sampling), ADC (analog-to-digital converter), and the like, and applies image processing to a video signal from the imaging element 110. Reference numeral 112 denotes a digital image processor which includes γ (gamma) correction, hue correction, edge correction, distortion correction for an imaging optical system, and the like, and applies image processing to a signal which is converted into a digital signal by the analog image processor 111.

Reference numeral 113 denotes a captured video output unit such as an NTSC encoder or the like, which converts a signal that has undergone the image processing by the digital image processor 113 into a predetermined video format, and outputs the converted signal. Reference numeral 120 denotes a display video input unit which includes PLL (phase locked loop), ADC (analog-to-digital converter), and the like, and fetches a video signal output from an external computer. Reference numeral 123 denotes a display video conversion unit which converts the resolution and frame frequency of a video picture based on a video signal input from the display video input unit 120 in correspondence with a compact display element 125, and performs distortion correction for a display optical system. Reference numeral 124 denotes a display element drive unit which includes a controller, driver, and the like for the compact display element 125. Reference numeral 125 denotes a compact display element such as an LCD (liquid crystal display), EL element, or the like.

Reference numeral 101R denotes a right-eye video capturing and display unit; and 101L, a left-eye video capturing and display unit. Reference numeral 130 denotes a controller such as a CPU or the like; 131, a distortion correction table unit for the imaging optical system; and 132, a distortion correction table unit for the display optical system. Reference numeral 502 denotes a cable for connecting the head mounted unit 501 and control unit 500.

FIG. 6 is a view showing the internal arrangement of the conventional video see-through type head mounted display. Note that FIG. 6 does not particularly illustrate a circuit board which mounts the circuit shown in FIG. 5 to allow easy understanding of the overall arrangement, and illustrates only the imaging element 110 and compact display element 125. Referring to FIG. 6, reference numeral 610 denotes a beam of external light as incoming light that comes from an external world. Reference numeral 611 denotes a wedge-shaped prism which bends the optical axis of incoming light in a direction different from the incoming direction to bring the position of the imaging element 110 close to that of an eyeball 622 of the observer as much as possible, and assures a larger distance. Reference numeral 612 denotes an imaging lens which forms an image of the beam 610 of the external light on the imaging element 110. Reference numeral 622 denotes an eyeball of the observer. Reference numeral 621 denotes a beam of display unit video light which emerges from the display element 125 and enters the eyeball 622 of the observer. Reference numeral 620 denotes a sculptured surface prism which enlarges light emerging from the display element 125, and guides it as a beam of light with a certain width to the eyeball 622 of the observer.

FIG. 7 is a view showing the outer appearance when the observer wears the conventional video see-through type head mounted display. Referring to FIG. 7, reference numeral 701 denotes a head of the observer. Reference numerals 101R and 101L denote right and left video capturing and display units; 501, a head mounted unit of the head mounted display; 500, a control unit of the head mounted display; and 502, a cable for connecting the head mounted unit 501 and the control unit 500.

The overall arrangement and the functions of respective units will be explained using these three figures. The observer wears the head mounted unit 501 of the head mounted display on his or her head 701 so that the head mounted unit 501 is located in front of the eyeballs 622, as shown in FIG. 7. The worn head mounted unit 501 includes the right-eye video capturing and display unit 101R for the right eye and the left-eye video capturing and display unit 101L for the left eye, each of which has the arrangement and layout, as shown in FIG. 6. That is, in the imaging system, the beam 610 of the external light enters from the external world, and the optical axis of the incoming light is bent in a direction different from the incoming direction by the wedge-shaped prism 611. In addition, the prism 611 assures a longer distance and the imaging lens 612 forms an image of the incoming light on the imaging element 110, thus bringing the position of the imaging element 110 close to that of the eyeball 622 of the observer as much as possible.

In this manner, a video picture which roughly matches an image actually seen by the observer's eyes can be captured. Also, in the display system, the sculptured surface prism 620 enlarges light emerging from the compact display element 125, and guides it to the eyeball 622 of the observer as the beam of light 621 having a certain width, so that the observer can observe an enlarged virtual image of the compact display element 125. The video picture captured by the imaging element 110 is processed by the arrangement shown in FIG. 5, and is transferred to an external computer. The external computer outputs a video picture obtained by superimposing a CG and the like on the transferred video picture to the head mounted display again, thus displaying that video picture on the display element 125.

That is, the analog image processor 111 applies, to a video picture captured by the imaging element 110, image processing such as AGC (automatic gain control), CDS (correlated double sampling), ADC (analog-to-digital converter), and the like in an analog signal state. The digital image processor 112 applies image processing such as γ (gamma) correction, hue correction, edge correction, and the like to the digital signal that has undergone the image processing by the analog image processor 111. At the same time, this digital signal undergoes image processing for correcting an imaging optical distortion based on data in the distortion correction table unit 131 for the imaging optical system.

The captured video output unit 113 converts the video signal that has undergone the image processing into a predetermined video format by the NTSC encoder or the like, and outputs the converted signal to the external computer. The external computer generates a video picture obtained by superimposing a CG and the like on this captured video picture, and inputs the generated video picture from its standard video output to the display video input unit 120 in a predetermined format such as VGA or the like. The display video input unit 120 generates pixel clocks from a sync signal using the PLL (phase locked loop). The ADC (analog-to-digital converter) converts an analog video signal input from the external computer into a digital video signal, which can be used in the subsequent processing circuits.

The display video conversion unit 123 converts the resolution and frame frequency of the digital video signal into the resolution of the compact display element 125 and the frame frequency suited to display. At the same time, the digital video signal undergoes image processing for correcting a display optical distortion based on data in the distortion correction table 132 for the display optical system. The controller, driver, and the like in the display element drive unit 124 process the digital video signal to a signal suited to drive the compact display element 125, and the compact display element 125 such as an LCD (liquid crystal display), EL element, or the like displays the video picture. Note that correction of a display optical distortion is described in, e.g., Japanese Patent Laid-Open No. 10-327373.

The controller 130 controls all these system units.

Since the head mounted unit 501 is demanded to have a lightweight as much as possible, it includes only the right-eye video capturing and display unit 101R and left-eye video capturing and display unit 101L, and other circuits are incorporated in the control unit 500. The cable 502 connects these two units, and has a length of 5 to 10 m under the assumption that the observer (701) moves around.

Note that the optical distortions differ depending on individuals due to the influences of individual differences, erection tolerances, and the like of optical parts. Therefore, in the distortion correction table unit 131 for the imaging optical system and distortion correction table unit 132 for the display optical system, distortion data are measured for respective individuals and measured data are written.

However, in the conventional video see-through type head mounted display, the head mounted unit and control unit must be indispensably paired. If these units are not paired, when the head mounted unit is exchanged, distortion correction values corresponding to the distortion data of the head mounted unit after exchange must be written in the distortion correction tables by some method.

SUMMARY OF THE INVENTION

The present invention has been made in consideration of the above problems and has as its object to provide a technique for executing image processing according to distortions unique to a display unit.

In order to achieve an object of the present invention, for example, a display apparatus of the present invention comprises the following arrangement.

That is, a display apparatus which comprises:
display unit comprising imaging unit adapted to capture an image of an external world, and displaying unit adapted to perform display based on the image captured by the imaging unit; and
processing unit adapted to receive the image captured by the imaging unit, to apply predetermined processing to the received image, and to output the processed image to the displaying unit, and
the display unit and the processing unit are configured as independent devices, wherein the display unit comprises:
first memory adapted to hold unique information associated with the display unit,
the processing unit comprises:
second memory adapted to hold unique information for each of one or more display units;
selection unit adapted to select, when the unique information held in the first memory is registered in the second memory, the registered information; and
registration unit adapted to register, when the unique information held in the first memory is not registered in the second memory, the unique information held in the first memory in the second memory, and
the processing unit applies processing unique to the display unit to the image received from the imaging unit using one of the unique information selected by the selection unit and the unique information registered by the registration unit.

In order to achieve an object of the present invention, for example, a method of controlling a display apparatus of the present invention comprises the following arrangement.

That is, a method of controlling a display apparatus which comprises:
display unit comprising imaging unit adapted to capture an image of an external world, and displaying unit adapted to perform display based on the image captured by the imaging unit; and
processing unit adapted to receive the image captured by the imaging unit, to apply predetermined processing to the received image, and to output the processed image to the displaying unit, and
the display unit and the processing unit are configured as independent devices, wherein
a control method of the processing unit which comprises a memory adapted to hold unique information for each of one or more display units, comprises:
a selection step of selecting, when unique information held in the display unit is registered in the memory, the registered information; and
a registration step of registering, when the unique information held in the display unit is not registered in the memory, the unique information held in the display unit in the memory, and
the processing unit applies processing unique to the display unit to the image received from the imaging unit using one of the unique information selected in the selection step and the unique information registered in the registration step.

In order to achieve an object of the present invention, for example, a display processing apparatus of the present invention comprises the following arrangement.

That is, a display processing apparatus which is connected to display unit that comprises imaging unit adapted to capture an image of an external world and displaying unit adapted to perform display based on the image captured by the imaging unit, comprising:

reception unit adapted to receive the image captured by the imaging unit;

output unit adapted to output an image obtained by applying predetermined processing to the received image to the display unit;

memory adapted to hold unique information associated with the display unit;

determination unit adapted to determine whether or not unique information of the connected display unit is held in the memory;

control unit adapted to select, when the determination unit determines that the unique information is held, the unique information stored in the memory, and to hold, when the determination unit determines that the unique information is not held, the unique information held in the display unit in the memory; and processing unit adapted to apply processing unique to the display unit to the image received from the imaging unit using one of the selected unique information and the unique information held in the memory.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

Figure 1:
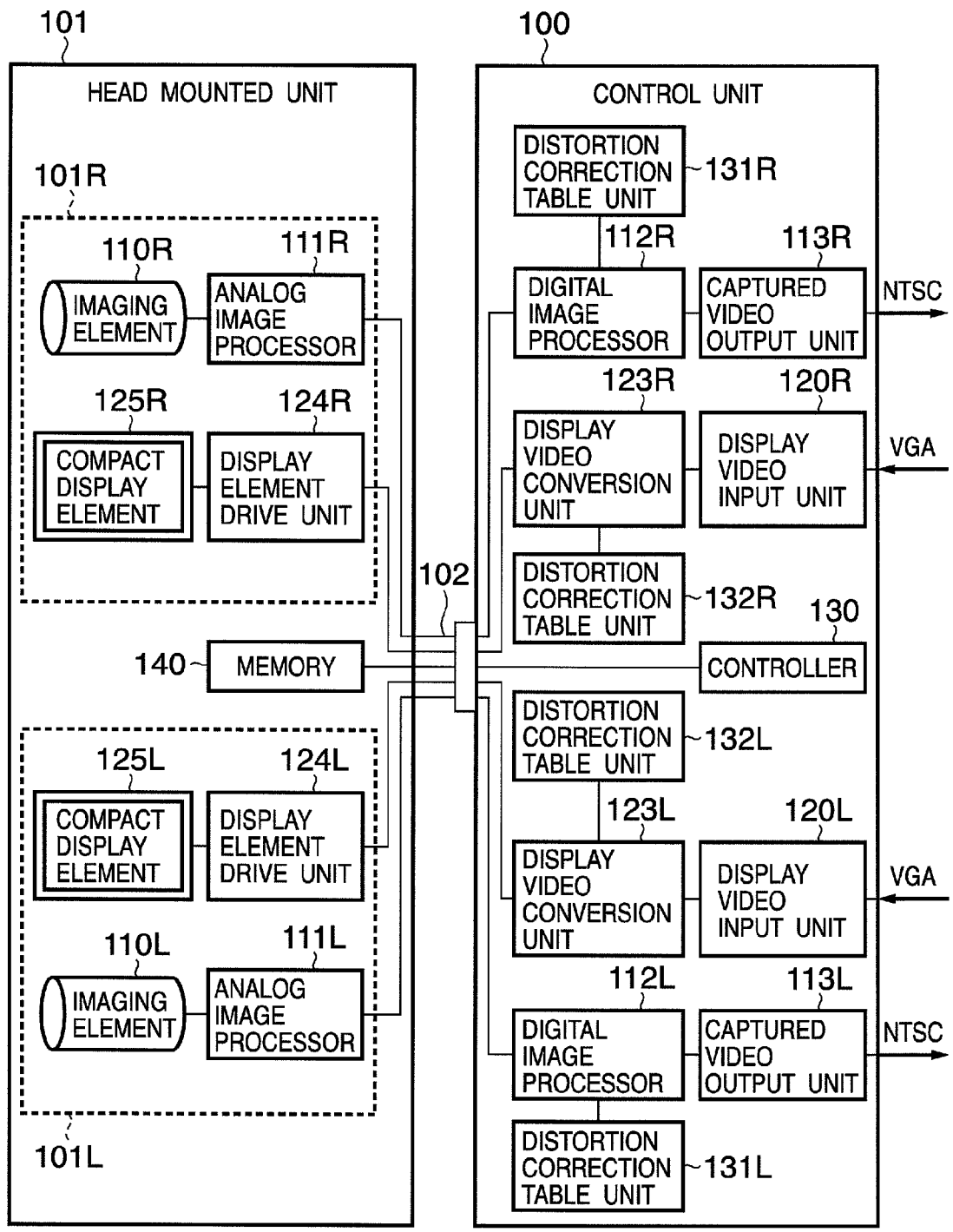
FIG. 1 is a block diagram showing the hardware arrangement of a head mounted display according to the first embodiment of the present invention.
Figure 5:
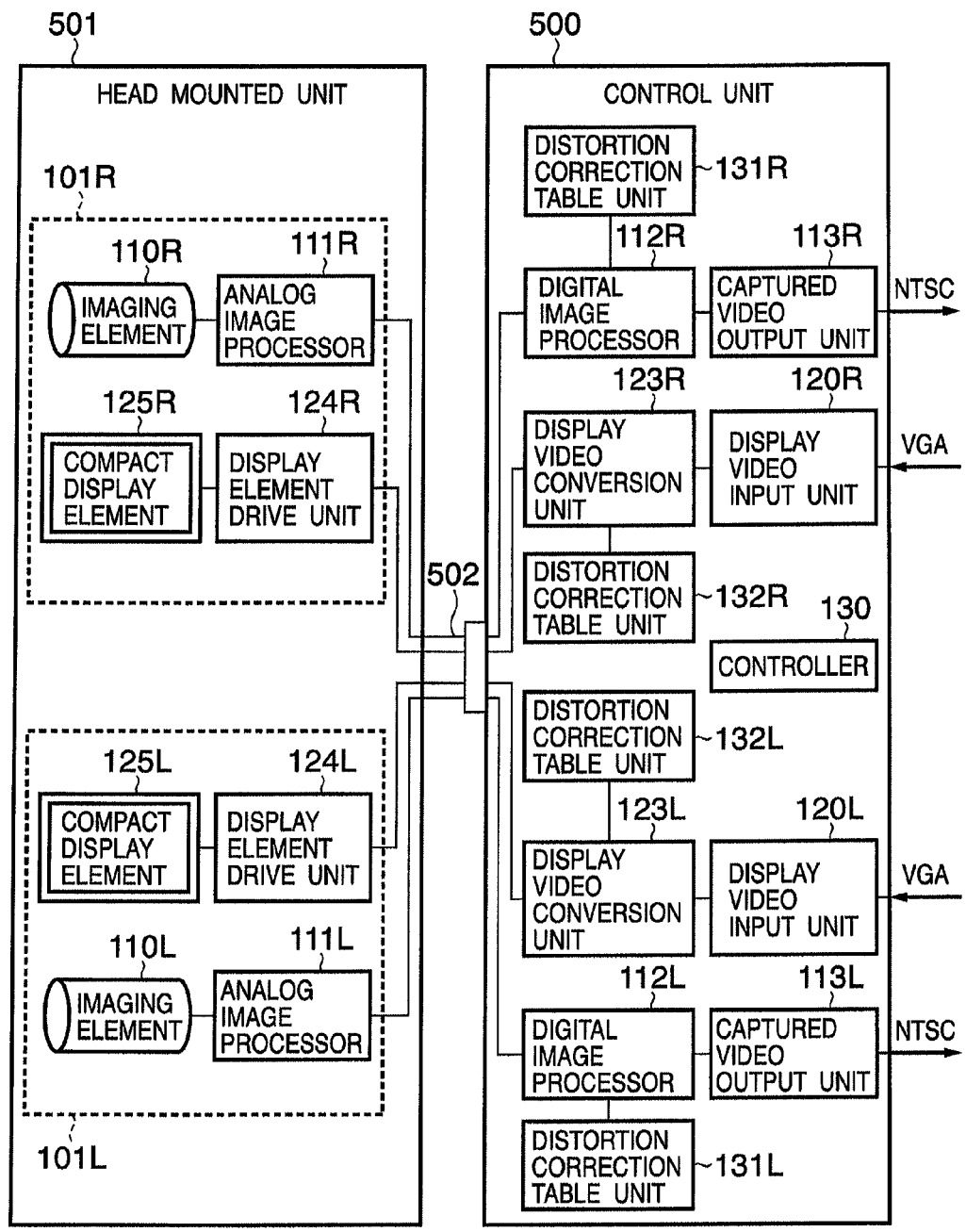
FIG. 5 is a block diagram showing the hardware arrangement of a conventional video see-through type head mounted display.

FIG. 1 is a block diagram showing the hardware arrangement of a head mounted display (sometimes to be simply referred to as a display hereinafter) according to this embodiment. Note that the same reference numerals in FIG. 1 denote the same parts as in FIG. 5. Also, components denoted by reference numerals with R and L are those for executing processing for the right eye and those for executing processing for the left eye. However, the components denoted by the same reference numerals with R and L have the same functions.

For example, imaging elements 110R and 110L respectively serve as external world imaging units for the right and left eyes, but they perform the same operations. In this manner, the components denoted by the same reference numerals with R and L have the same functions. The following description will be given by omitting R and L unless otherwise specified.

As shown in FIG. 1, the display according to this embodiment comprises a head mounted unit (display unit) and a control unit (processing unit) 100. Referring to FIG. 1, reference numeral 110 denotes an imaging element which comprises a CCD, CMOS area sensor, or the like, and is used to capture a moving image of the external world. Reference numeral 111 denotes an analog image processor which comprises AGC (automatic gain control), CDS (correlated double sampling), ADC (analog-to-digital converter), and the like, and applies image processing to a video signal from the imaging element 110. Reference numeral 112 denotes a digital image processor which applies image processing (γ (gamma) correction, hue correction, edge correction, distortion correction for an imaging optical system, and the like) to a signal which is converted into a digital signal by the analog image processor 111. Note that the digital image processor 112 uses distortion correction table data (to be described later) held in a distortion correction table unit 131 upon executing the distortion correction processing.

Reference numeral 113 denotes a captured video output unit which comprises an NTSC encoder and the like and converts the signal that has undergone the image processing by the digital image processor 112 into a predetermined format to output the converted signal. Reference numeral 120 denotes a display video input unit which comprises PLL (phase locked loop), ADC (analog-to-digital converter), and the like, and fetches a video signal output from an external computer.

Reference numeral 123 denotes a display video conversion unit which converts the resolution and frame frequency of a video picture based on a video signal input from the display video input unit 120 in correspondence with a compact display element 125, and performs distortion correction for a display optical system. Note that the display video conversion unit 123 uses distortion correction table data (to be described later) held in a distortion correction table unit 132 upon executing the distortion correction processing.

Reference numeral 124 denotes a display element drive unit which comprises a controller, driver, and the like for the compact display element 125. Reference numeral 125 denotes a compact display element which comprises an LCD (liquid crystal display), EL element, or the like.

Reference numeral 101R denotes a right-eye video capturing and display unit which comprises the imaging element 110R, analog image processor 111R, display element drive unit 124R, and compact display element 125R, as shown in FIG. 1. Reference numeral 101L denotes a left-eye video capturing and display unit which comprises the imaging element 110L, analog image processor 111L, display element drive unit 124L, and compact display element 125L, as shown in FIG. 1.

Reference numeral 130 denotes a controller which comprises a processor such as a CPU, MPU, or the like. Reference numeral 131 denotes a table unit in which data (distortion correction table data) used in distortion correction for the imaging optical system are registered. Reference numeral 132 denotes a table unit in which data (distortion correction table data) used in distortion correction for the display optical system are registered. Note that distortion correction table data for various head mounted units are registered in these table units 131 and 132.

Reference numeral 140 denotes a memory for recording distortion correction table data (unique information) unique to the head mounted unit 101.

Reference numeral 102 denotes a cable used to connect the head mounted unit 101 and control unit 100. That is, the head mounted unit 101 and control unit 100 are configured as independent devices.

Figure 7:
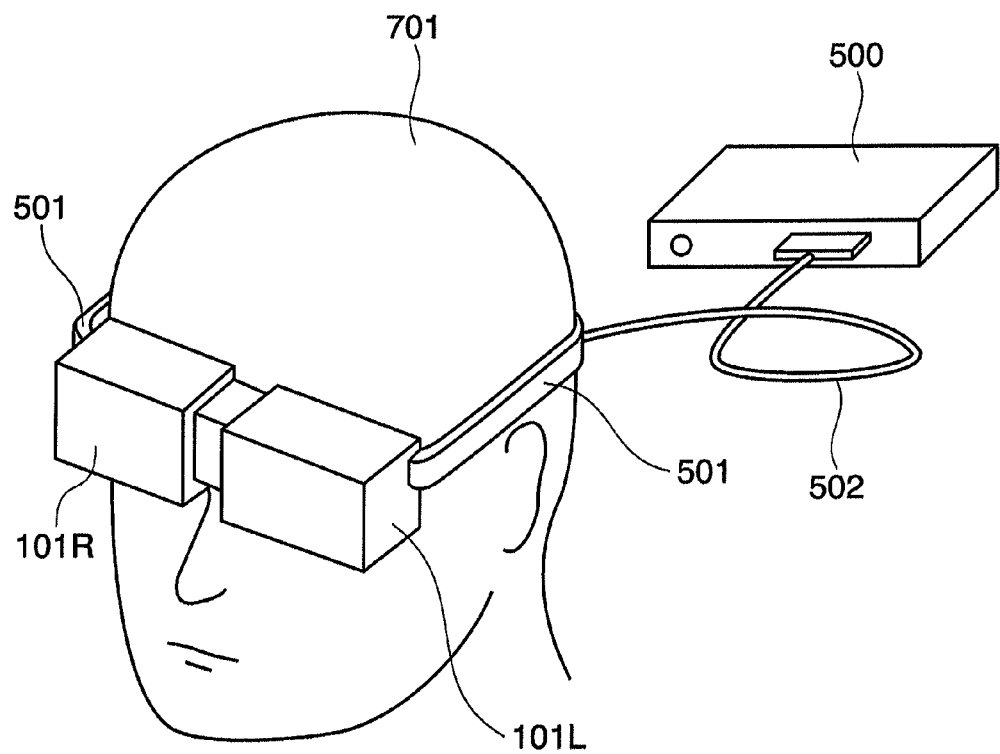
FIG. 7 is a view showing the outer appearance when the observer wears the conventional video see-through type head mounted display.

The operation of the display with the above arrangement will be described below. In order to observe an image via the head mounted unit 101 according to this embodiment, the observer wears this head mounted unit 101 on his or her head, as shown in FIG. 7. In this case, the observer wears this head mounted unit 101 on the head so that the unit 101L is located in front of the left eye of the observer, and the unit 101R is located in front of the right eye.

Figure 6:
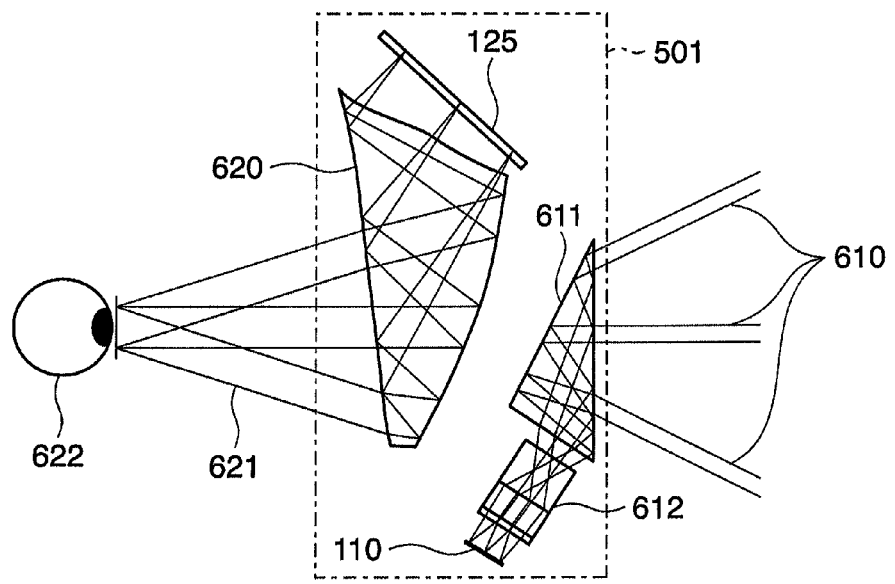
FIG. 6 is a view showing the internal arrangement of the conventional video see-through type head mounted display.

As shown in FIG. 6, in the imaging system, a beam 610 of external light enters from the external world, and the optical axis of that incoming light is bent in a direction different from the incoming direction by a wedge-shaped prism 611. In addition, the prism 611 assures a longer distance and an imaging lens 612 forms an image of the incoming light on the imaging element 110. In this way, the position of the imaging element 110 is brought close to that of an eyeball 622 of the observer as much as possible. As a result, a video picture which roughly matches an image actually seen by eyes can be captured.

Also, in the display system, as shown in FIG. 6, a sculptured surface prism 620 enlarges light emerging from the compact display element 125, and guides it to the eyeball 622 of the observer as the beam of light 621 having a certain width, so that the observer can observe an enlarged virtual image of the compact display element 125.

As for the operations of the respective units shown in FIG. 1, a video picture captured by the imaging element 110 is input to the analog image processor 111 as an analog image signal. The analog image processor 111 applies processing such as AGC (automatic gain control), CDS (correlated double sampling), ADC (analog-to-digital converter), and the like to this input analog image signal. The processor 111 outputs the processed signal as a digital image signal to the digital image processor 112 via the cable 102. The digital image processor 112 applies image processes such as γ (gamma) correction, hue correction, edge correction, and the like to the digital signal input from the analog image processor 111. Furthermore, the digital image processor 112 applies, to this digital signal, image processing for correcting an imaging optical distortion using distortion correction table data selected by processing to be described later of those held in the distortion correction table unit 131.

The captured video output unit 113 converts the digital image signal processed by the digital image processor 112 into a predetermined video format using the NTSC encoder and the like, and outputs the converted signal to the external computer.

The external computer generates a composite image obtained by superimposing a CG and the like on an image represented by this output digital image signal, and outputs the generated composite image from its standard video output to the display video input unit 120 in a predetermined format such as VGA or the like.

In data communications with the external computer, in this embodiment, a video output signal to the external computer is an NTSC signal, and a video input signal from the external computer is a VGA signal. However, the present invention is not limited to such specific signals. For example, signals of IEEE1394, USB, DVI, and the like as digital interfaces may be used.

The display video input unit 120 generates pixel clocks from a sync signal using the PLL (phase locked loop). The ADC (analog-to-digital converter) converts the analog video signal input from the external computer into a digital video signal which can be used in subsequent processing circuits.

The display video conversion unit 123 converts the resolution and frame frequency of the digital video signal into the resolution of the compact display element 125 and the frame frequency optimal to display. Furthermore, the display video conversion unit 123 applies, to this digital signal, image processing for correcting a display optical distortion using distortion correction table data selected by processing to be described later of those held in the distortion correction table unit 132.

The controller, driver, and the like of the display element drive unit 124 process the digital image signal which has undergone the image processing to a signal suited to drive a compact display element 125, and the processed signal is displayed as an image on the compact display element 125 (LCD (liquid crystal display), EL element, or the like). The image to be displayed is an image obtained by superimposing a CG on an image captured by the imaging element 110.

The composite image displayed on the compact display element 125 is guided to the eye 622 of the observer as a beam of light 621 by the arrangement described above using FIG. 6. In this manner, the observer can observe this composite image in front of eyes.

Figure 2:
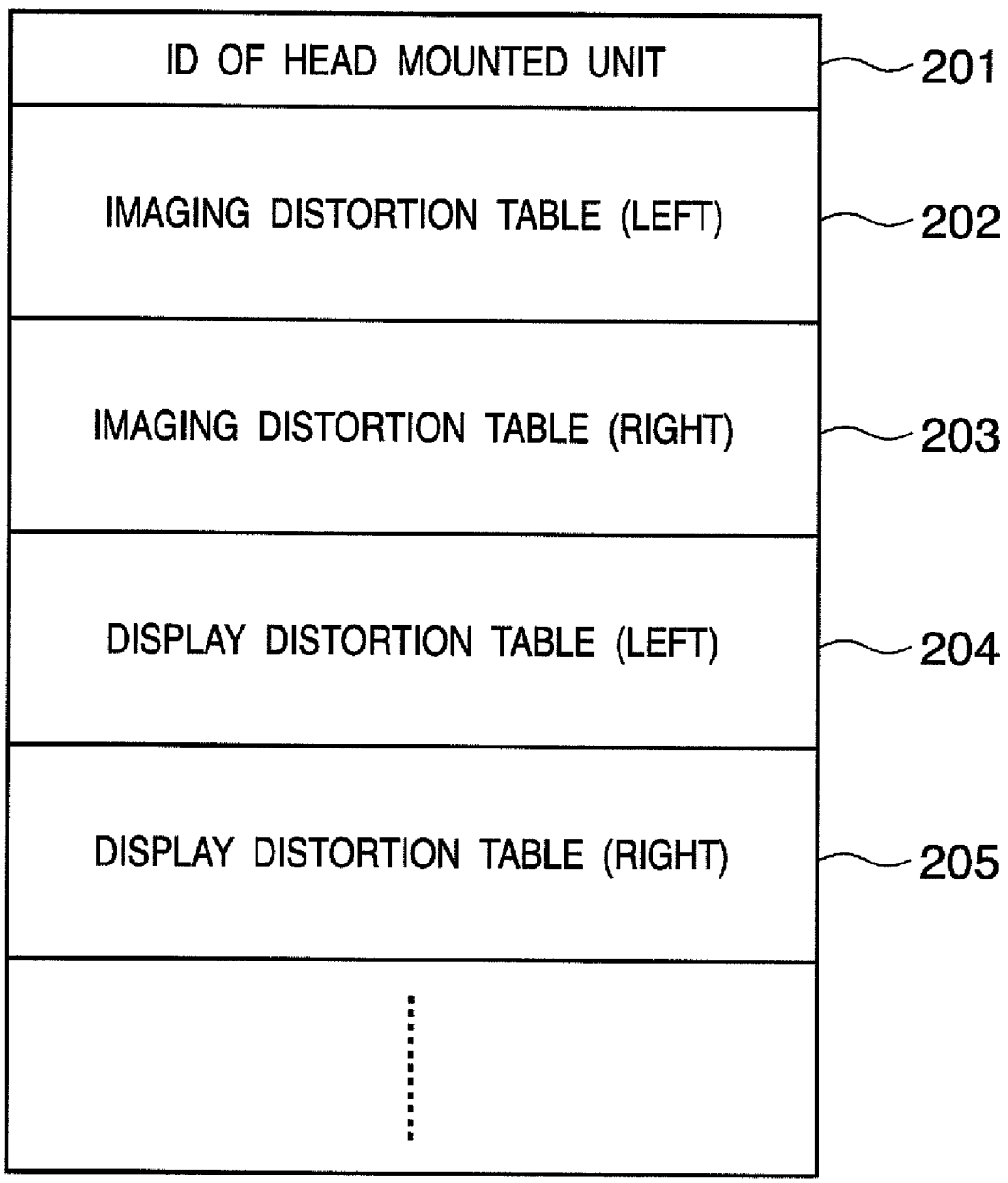
FIG. 2 shows a configuration example of "distortion correction table data unique to a head mounted unit 101" held in a memory 140.

Data held in the memory 140 will be described below. FIG. 2 shows a configuration example of the "distortion correction table data unique to a head mounted unit 101" held in the memory 140. Optical distortions associated with the display optical system and imaging optical system are different for respective head mounted units because they are caused by the influences of individual differences, erection tolerances, and the like of optical parts. Therefore, optical distortions associated with the display optical system and imaging optical system unique to the head mounted unit 101 are measured in advance, and are stored as distortion correction table data in the memory 140.

Referring to FIG. 2, reference numeral 201 denotes an identification ID unique to the head mounted unit 101. Note that information other than the identification ID may be used as long as it can uniquely identify the head mounted unit 101.

Reference numeral 202 denotes distortion correction table data obtained by measuring an optical distortion of the left imaging optical system of the head mounted unit 101. Reference numeral 203 denotes distortion correction table data obtained by measuring an optical distortion of the right imaging optical system of the head mounted unit 101. Reference numeral 204 denotes distortion correction table data obtained by measuring an optical distortion of the left display optical system of the head mounted unit 101. Reference numeral 205 denotes distortion correction table data obtained by measuring an optical distortion of the right display optical system of the head mounted unit 101.

Figure 3B:
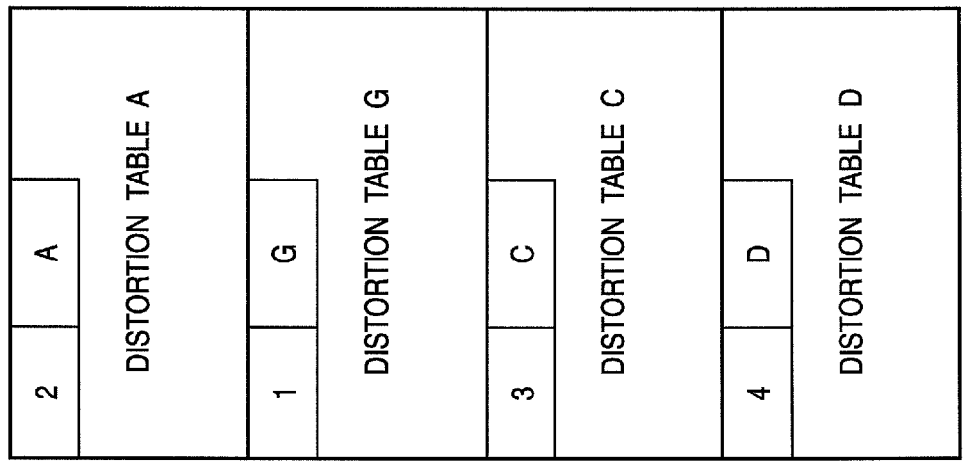
FIG. 3B shows another configuration example of distortion correction table data held in table units 131 and 132.
Figure 3A:
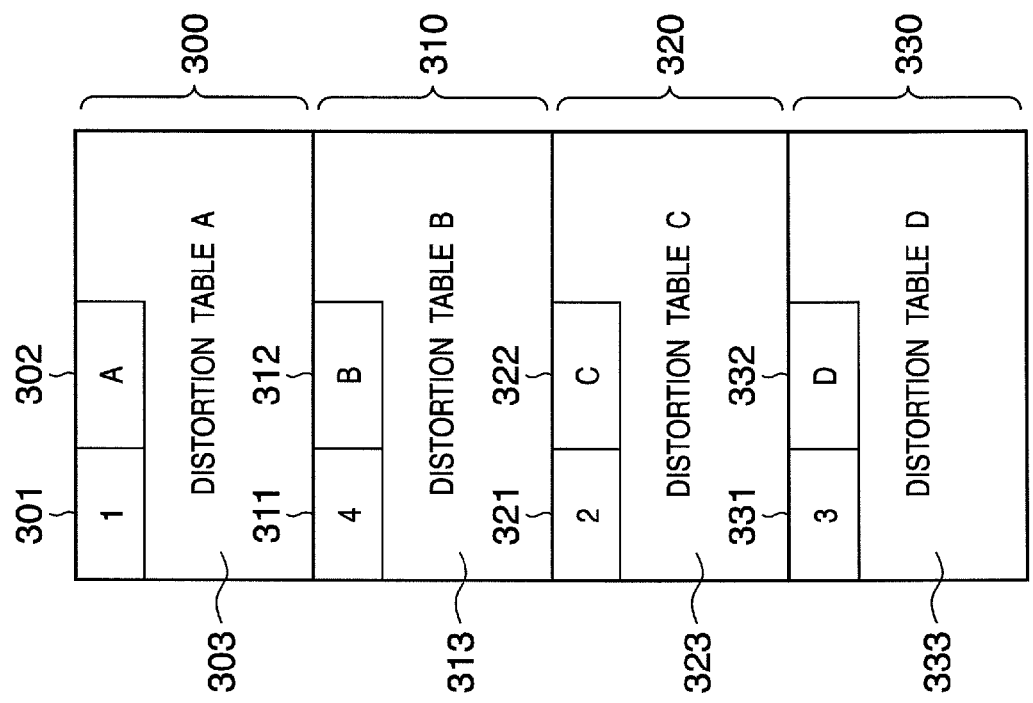
FIG. 3A shows a configuration example of distortion correction table data held in table units 131 and 132.

FIGS. 3A and 3B show configuration examples of distortion correction table data held in the table units 131 and 132. FIG. 3B will be described later.

As shown in FIG. 3A, distortion correction table data include those which correspond to various head mounted units. In FIG. 3A, distortion correction table data corresponding to respective head mounted units are block data 300, 310, 320, and 330.

For example, when the distortion correction table data shown in FIG. 3A are those held in the table unit 131L, the block data 300 to 330 are distortion correction table data obtained by measuring optical distortions of the left imaging optical systems of the corresponding head mounted units.

Or when the distortion correction table data shown in FIG. 3A are those held in the table unit 131R, the block data 300 to 330 are distortion correction table data obtained by measuring optical distortions of the right imaging optical systems of the corresponding head mounted units.

For example, when the distortion correction table data shown in FIG. 3A are those held in the table unit 132L, the block data 300 to 330 are distortion correction table data obtained by measuring optical distortions of the left display optical systems of the corresponding head mounted units.

Or when the distortion correction table data shown in FIG. 3A are those held in the table unit 132R, the block data 300 to 330 are distortion correction table data obtained by measuring optical distortions of the right display optical systems of the corresponding head mounted units.

As described above, the distortion correction table data of the respective head mounted units are registered in the table units 131 and 132.

The configuration of the block data will be described below.

Reference numeral 300 denotes first block data. Reference numeral 301 denotes data which indicates the use priority level of the first block data; and 302, an identification ID of the head mounted unit corresponding to the first block data. Reference numeral 303 denotes a distortion correction table data body. Therefore, the first block data 300 includes the distortion correction table data 303 corresponding to the head mounted unit specified by the identification ID 302.

The same configuration of such block data applies to the block data 310, 320, and 330.

The mechanism for displaying an image on the compact display element 125 optically works, as shown in FIG. 6. Since this mechanism is as has been described for the conventional display, a description thereof will be omitted.

The outer appearance when the observer wears the display according to this embodiment on the head is as shown in FIG. 7. Since such outer appearance is as has been described for the conventional display, a description thereof will be omitted.

This embodiment is different from the prior art in that distortion correction table data used upon executing distortion correction for an image are determined in accordance with the head mounted unit (the head mounted unit 110 in this embodiment) to be used before the image is displayed on the compact display element 125. The processing for determining distortion correction table data used for the distortion correction processing (those associated with the display optical system and imaging optical system) will be described below using FIG. 4 that shows the flowchart of that processing.

Figure 4:
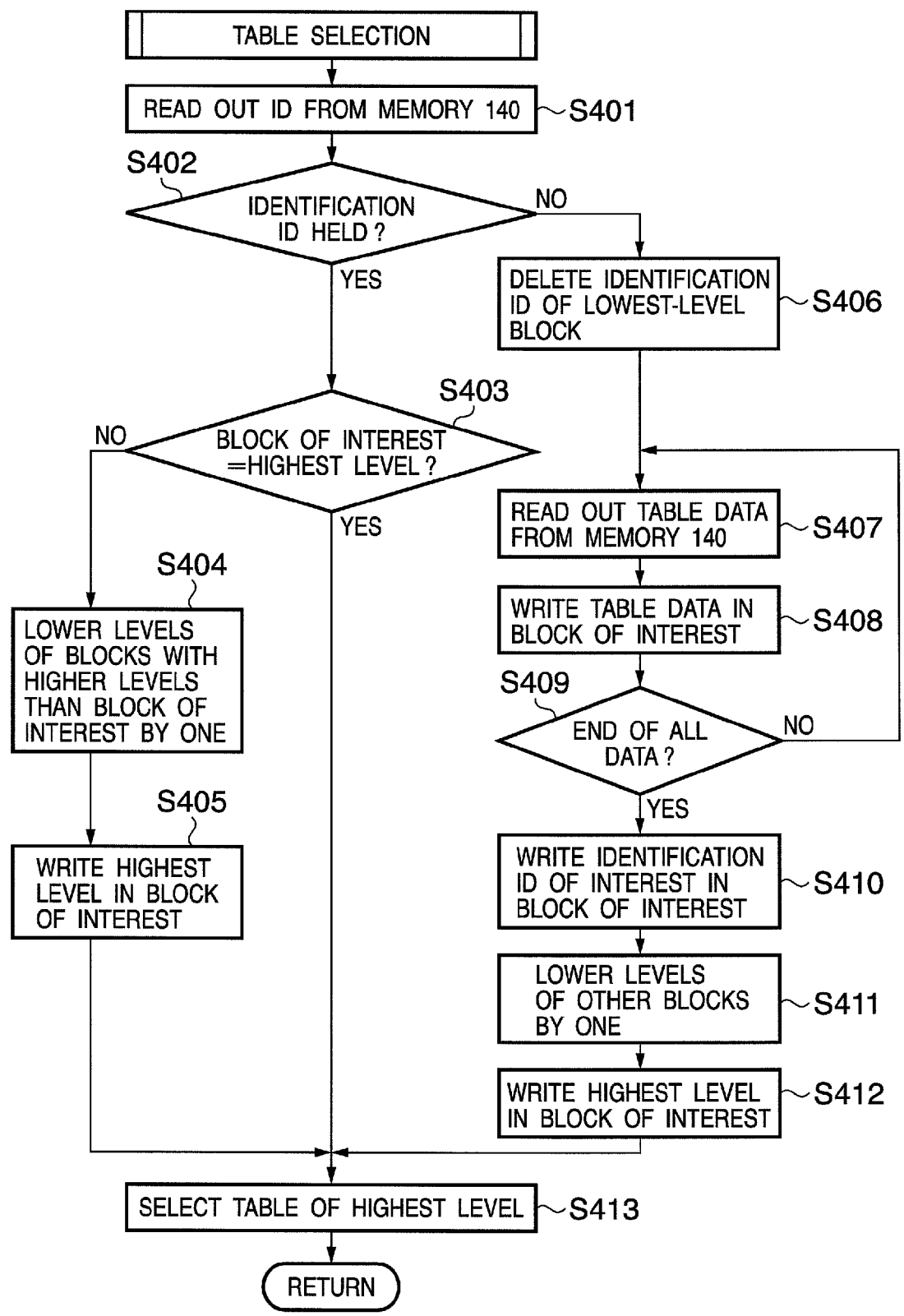
FIG. 4 is a flowchart of processing for determining distortion correction table data used for distortion correction processing (those associated with a display optical system and imaging optical system)

Note that programs and data used to make the controller 130 execute the processing according to the flowchart of FIG. 4 are stored in a memory (not shown) in the controller 130. The processing according to the flowchart of FIG. 4 is executed at a timing at which the controller 130 detects that the power switch of the display according to this embodiment is turned on. Alternatively, the processing is executed at a timing at which the control unit 100 detects that a head mounted unit to be connected to the control unit 100 is exchanged in an energized state.

The identification ID (201 in FIG. 2) of the head mounted unit 101 held in the memory 140 is read out (step S401). The identification ID read out in step S401 is compared with those included in the respective block data held in the table units 131 and 132 (step S402). As a result, it is checked if the identification ID of the head mounted unit 101 is held in the table units 131 and 132.

In case of FIG. 2 and FIGS. 3A and 3B, it is checked if the identification ID 201 matches the identification ID 302, 312, 322, or 332. That is, this processing corresponds to check processing for determining whether or not the distortion correction table data 202 and 203 held in the memory 140 are also registered in the table unit 131 and whether or not the distortion correction table data 204 and 205 held in the memory 140 are also registered in the table unit 132.

If it is determined as a result of the check processing in step S402 that the identification ID of the head mounted unit 101 is held in the table units 131 and 132, the flow advances to step S403. It is checked with reference to the block data in the table units 131 and 132 having the identification ID of the head mounted unit 101 if the use priority level of this block data is the highest level (first rank) (step S403). In case of FIGS. 3A and 3B, when the block data having the identification ID of the head mounted unit 101 is the block data 310, it is checked if the data 311 indicating the use priority level indicates the highest level.

If it is determined as a result of checking in step S403 that the use priority level of the block data in the table units 131 and 132 having the identification ID of the head mounted unit 101 is the highest level, the flow advances to step S413. Then, the distortion correction table data body in this block data is selected as distortion correction table data to be used (step S413).

That is, if the use priority level of the block data in the table unit 131 having the identification ID of the head mounted unit 101 is the highest level, the distortion correction table data body in this block data is selected as distortion correction table data used in the distortion correction processing associated with the imaging optical system. On the other hand, if the use priority level of the block data in the table unit 132 having the identification ID of the head mounted unit 101 is the highest level, the distortion correction table data body in this block data is selected as distortion correction table data used in the distortion correction processing associated with the display optical system.

On the other hand, if it is determined as a result of checking in step S403 that the use priority level of the block data in the table units 131 and 132 having the identification ID of the head mounted unit 101 is not the highest level, the flow advances to step S404. Then, the priority level of the block data having a higher priority level than the use priority level in the block data in the table units 131 and 132 having the identification ID of the head mounted unit 101 is lowered by 1 (step S404). Next, the use priority level in the block data in the table units 131 and 132 having the identification ID of the head mounted unit 101 is updated to the highest level (step S405).

Then, the distortion correction table data body in the block data updated to the highest level is selected as distortion correction table data to be used (step S413). That is, the distortion correction table data body in the block data in the table unit 131 updated to the highest level is selected as distortion correction table data to be used in the distortion correction processing associated with the imaging optical system. Also, the distortion correction table data body in the block data in the table unit 132 updated to the highest level is selected as distortion correction table data to be used in the distortion correction processing associated with the display optical system.

On the other hand, if it is determined in the check processing in step S402 that the identification ID of the head mounted unit 101 is not held in the table units 131 and 132, the flow advances to step S406. Of the block data held in the table units 131 and 132, one having a lowest use priority level is specified, and the use priority level in the specified block data is deleted (step S406). In the delete processing, for example, an invalid numerical value (999) is set. For example, when the block data held in the table units 131 and 132 have the state shown in FIG. 3A, the block data with the use priority level="4", i.e., the block data 310, is specified. By setting an invalid numerical value in the data field 311 indicating the use priority level of this block data 310, the use priority level is deleted.

Referring back to FIG. 4, the distortion correction table data are read out from the memory 140 (step S407). The readout distortion correction table data are used to update the distortion correction table data body in the block data (whose use priority level has been deleted) specified in step S406 (step S408). That is, the readout distortion correction table data are overwritten on the distortion correction table data body in the block data specified in step S406. For example, when the block data held in the table units 131 and 132 have the state shown in FIG. 3A, the block data 310 is specified in step S406. Therefore, the distortion correction table data read out from the memory 140 are overwritten on the distortion correction table data body 313 in this block data 310.

Upon completion of the overwrite processing, the flow advances to step S410 via step S409, and the identification ID of the head mounted unit 101 read out in step S401 is written in that in the block data specified in step S406 (step S410). For example, when the block data held in the table units 131 and 132 have the state shown in FIG. 3A, the block data 310 is specified in step S406. Therefore, as shown in FIG. 3B, the identification ID ("G" in FIG. 3B) of the head mounted unit 101 is written in the identification ID field 312 of this block data 310.

The use priority levels of the block data other than that specified in step S406 are lowered by 1 (step S411). The use priority level in the block data specified in step S406 is updated to the highest level (step S412).

Then, the distortion correction table data body in the block data updated to the highest level is selected as distortion correction table data to be used (step S413). That is, the distortion correction table data body in the block data in the table unit 131 updated to the highest level is selected as distortion correction table data to be used in the distortion correction processing associated with the imaging optical system. Also, the distortion correction table data body in the block data in the table unit 132 updated to the highest level is selected as distortion correction table data to be used in the distortion correction processing associated with the display optical system.

As described above, according to this embodiment, since the distortion correction table data according to the head mounted unit connected to the control unit are obtained, the distortion correction processing that considers individual differences of the head mounted units can be executed.

Note that the types of distortion correction table data are not limited to those used to correct optical distortions associated with the display optical system and imaging optical system, and data used to correct other distortions may be stored. The individual differences of the head mounted units are not limited to "distortions", but various other differences (e.g., parameters depending on individual differences of CCDs and LCDs and the like) may be considered. Hence, in place of the distortion correction table data, unique information generated based on these individual differences as data may be used. Note that this embodiment can be similarly applied even when such unique information is used in place of the distortion correction table data. Also, this embodiment can be similarly applied even in a handheld display.

Second Embodiment

In the first embodiment, the head mounted unit has independent display systems and imaging systems for the right and left eyes. Alternatively, one pair of the imaging system and display system may cope with two eyes or one eye.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function extension card or a function extension unit, which is inserted in or connected to the computer. After that, the functions of the above-mentioned embodiments are implemented by some or all of actual processing operations executed by a CPU or the like arranged in the function extension card or function extension unit based on an instruction of the program code. Such case is also included in the present invention.

When the present invention is applied to the recording medium, that recording medium stores program codes corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249953, filed on Aug. 30, 2005, which is hereby incorporated by reference herein in its entirety.

What is claimed is:
1. A display apparatus which comprises:
 display unit comprising imaging unit adapted to capture an image of an external world, and displaying unit adapted to perform display based on the image captured by said imaging unit; and processing unit adapted to receive the image captured by said imaging unit, to apply predetermined processing to the received image, and to output the processed image to the displaying unit, and said display unit and said processing unit are configured as independent devices, wherein said display unit comprises:

first memory adapted to hold unique information associated with said display unit, said processing unit comprises:

second memory adapted to hold unique information for each of one or more display units;

selection unit adapted to select, when the unique information held in said first memory is registered in said second memory, the registered information; and registration unit adapted to register, when the unique information held in said first memory is not registered in said second memory, the unique information held in said first memory in said second memory, and said processing unit applies processing unique to said display unit to the image received from said imaging unit using one of the unique information selected by said selection unit and the unique information registered by said registration unit.

2. The apparatus according to claim 1, wherein when the unique information held in said first memory is registered in said second memory, said processing unit further comprises:

first setting unit adapted to set, when a use priority level of the registered unique information is not a highest priority level, the use priority level of the unique information to the highest priority level.

3. The apparatus according to claim 1, wherein when the unique information held in said first memory is not registered in said second memory, said processing unit further comprises:

second setting unit adapted to register the unique information held in said first memory in said second memory, and to update unique information set with a lowest priority level of the unique information registered in said second memory by setting a use priority level of the registered unique information to a highest priority level.

4. The apparatus according to claim 1, wherein the unique information includes distortion correction table data obtained by measuring an optical distortion associated with an imaging optical system of said imaging unit, and distortion correction table data obtained by measuring an optical distortion associated with a display optical system of said displaying unit.

5. A method of controlling a display apparatus which comprises:

display unit comprising imaging unit adapted to capture an image of an external world, and displaying unit adapted to perform display based on the image captured by the imaging unit; and processing unit adapted to receive the image captured by the imaging unit, to apply predetermined processing to the received image, and to output the processed image to the displaying unit, and the display unit and the processing unit are configured as independent devices, wherein a control method of the processing unit which comprises a memory adapted to hold unique information for each of one or more display units, comprises:

a selection step of selecting, when unique information held in the display unit is registered in the memory, the registered information; and a registration step of registering, when the unique information held in the display unit is not registered in the memory, the unique information held in the display unit in the memory, and the processing unit applies processing unique to the display unit to the image received from the imaging unit using one of the unique information selected in the selection step and the unique information registered in the registration step.

6. A display processing apparatus which is connected to display unit that comprises imaging unit adapted to capture an image of an external world and displaying unit adapted to perform display based on the image captured by the imaging unit, comprising:

reception unit adapted to receive the image captured by the imaging unit;

output unit adapted to output an image obtained by applying predetermined processing to the received image to the display unit;

memory adapted to hold unique information associated with the display unit;

determination unit adapted to determine whether or not unique information of the connected display unit is held in said memory;

control unit adapted to select, when said determination unit determines that the unique information is held, the unique information stored in said memory, and to hold, when said determination unit determines that the unique information is not held, the unique information held in the display unit in said memory; and processing unit adapted to apply processing unique to the display unit to the image received from the imaging unit using one of the selected unique information and the unique information held in said memory.

* * * * *